No. 766,909. Patented August 9, 1904.

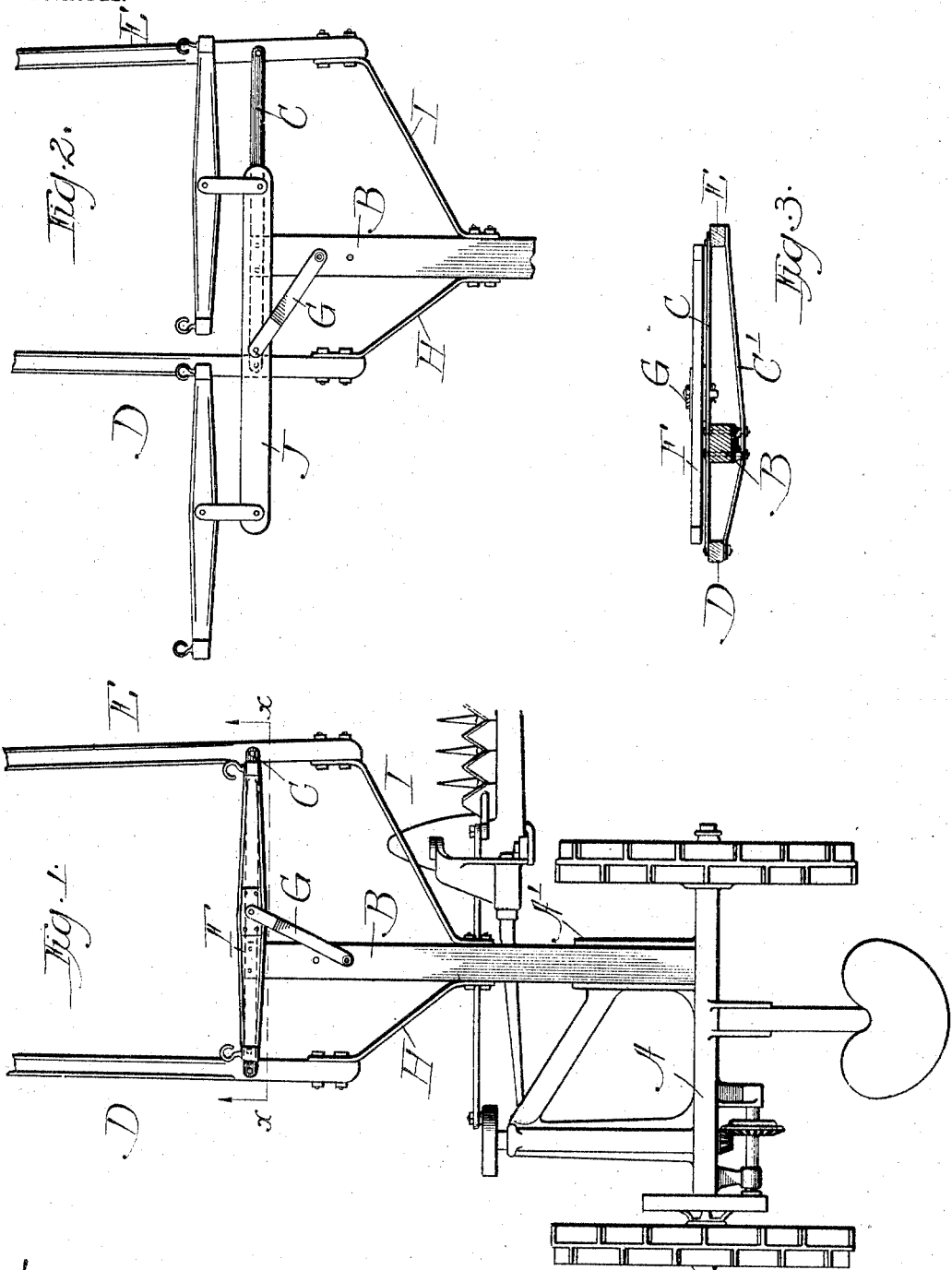

UNITED STATES PATENT OFFICE.

HERBERT B. SPERRY, OF SPRINGFIELD, OHIO, ASSIGNOR TO THE INTERNATIONAL HARVESTER COMPANY, A CORPORATION OF NEW JERSEY.

THILL ATTACHMENT FOR MOWERS.

SPECIFICATION forming part of Letters Patent No. 766,909, dated August 9, 1904.

Application filed January 2, 1904. Serial No. 187,510. (No model.)

*To all whom it may concern:*

Be it known that I, HERBERT B. SPERRY, a citizen of the United States, residing at Springfield, in the county of Clark and State of Ohio, have invented certain new and useful Improvements in Thill Attachments for Mowers, of which the following is a specification, reference being had to the accompanying drawings, forming a part thereof.

This invention relates to thill attachments in general, and particularly to their use as an attachment for mowers or harvesters.

The object of the invention is to provide an attachment that may be used with either one or two draft-animals, according to the arrangement of its parts.

It has been customary with manufacturers of this class of machinery to furnish both thills and tongue, as the user would sometimes use a single animal and at others two; but with my improvement the tongue is not needed nor is the efficiency of the attachment impaired by dispensing with it.

The invention consists in the construction and relative arrangement of parts, as shown in the accompanying drawings, like letters representing like parts.

Figure 1 is a plan view of a mowing-machine with the thill attachment secured thereto. Fig. 2 is a plan view of the thill attachment as arranged for two draft-animals, and Fig. 3 a section on the line $x\,x$ of Fig. 1.

A represents the frame of a mowing-machine, and A' is the bracket to which is secured the short pole B, which may be considered a part of the mower-frame. Two cross-bars C and C' are secured to the front end of the pole, one above and the other below, and project laterally from its opposite sides. The thills D and E are secured between the outer ends of the bars. Midway between the thills the bar C is provided with a hole, and when a single draft-animal is used a swingletree or single-draft attachment F is pivoted thereon, and a hammer-strap G extends from the pivotal point to the frame or pole in the usual manner. Diagonal braces H and I connect the rear end of the thills with the pole. When one draft-animal is used, the device is arranged, as shown in Fig. 1, with the swingletree F located centrally between the thills D and E. When two draft-animals are used, the swingletree F is removed and a two-horse evener or double-draft attachment J is pivotally attached to the bar C near the thill D at one side, and the hammer-strap G extends to a point on the pole forward of that at which it is secured, as shown in Fig. 1, and is fastened as represented in Fig. 2.

The swingletrees are attached to the evener in a common manner, and one animal will be placed between the thills and one outside the thill D.

What I claim as my invention, and desire to secure by Letters Patent, is—

1. In a thill attachment for mowers, the combination of a pair of thills suitably connected at their rear ends to the frame of the mower, a double-draft attachment, and means for attaching said double-draft attachment approximately in line with one of the thills.

2. In a thill attachment for mowers, the combination of a pair of thills suitably attached to the frame of the machine, a double-draft attachment, and means for connecting said draft attachment at one side of the central draft line of the thills.

3. In a thill attachment for harvesters or mowers, the combination of the thills, the cross-bar connecting their rear ends, a double-draft device, and means for attaching said device to one end of the cross-bar.

4. In a thill attachment for mowers, the combination of the frame and the pole-piece secured thereto, cross-bars secured to the top and bottom of the pole-piece at its front end and extending laterally therefrom, thills secured between the outer ends of the cross-bars and extending rearward of the same, brace-pieces connecting the rear end of each thill to the pole-piece, a double-draft device, and means for connecting the said device approximately in line with one of said thills.

5. In a thill attachment for mowers, the combination of the frame adapted to receive a pole-piece, the pole-piece, cross-bars secured to the top and bottom of the pole-piece and extending laterally upon opposite sides thereof, thills secured between the ends of the cross-bars having their ends extending in rear of the same, diagonally-disposed braces connecting the rear ends of the thills with the pole-piece, a two-horse evener pivotally connected to the upper cross-bar near one end thereof, and a hammer-strap extending from the pivot rearward to the pole-piece.

In witness whereof I hereto affix my signature in presence of two witnesses.

HERBERT B. SPERRY.

Witnesses:
MAURICE KANE,
E. E. NAFUS.